(12) United States Patent
Seki et al.

(10) Patent No.: US 7,739,659 B2
(45) Date of Patent: Jun. 15, 2010

(54) INFORMATION PROCESSING APPARATUS, EXECUTABILITY DETERMINING METHOD, AND COMPUTER PROGRAM FOR THE SAME

(75) Inventors: Yasuharu Seki, Chiba (JP); Yoshitaka Onuma, Kanagawa (JP); Tatsuya Konno, Tokyo (JP)

(73) Assignee: Sony Corporation, Tokyo (JP)

( * ) Notice: Subject to any disclaimer, the term of this patent is extended or adjusted under 35 U.S.C. 154(b) by 1407 days.

(21) Appl. No.: 11/131,259

(22) Filed: May 18, 2005

(65) Prior Publication Data

US 2005/0262496 A1  Nov. 24, 2005

(30) Foreign Application Priority Data

May 24, 2004 (JP) .............................. 2004-153754

(51) Int. Cl.
  *G06F 9/44* (2006.01)
  *G06F 7/04* (2006.01)
  *G06F 17/30* (2006.01)
(52) U.S. Cl. .......................... 717/121; 726/30; 726/32; 726/33
(58) Field of Classification Search ........................ None
See application file for complete search history.

(56) References Cited

U.S. PATENT DOCUMENTS

| | | | | |
|---|---|---|---|---|
| 6,721,891 B1* | 4/2004 | Borza | ........................... | 726/20 |
| 2002/0184259 A1* | 12/2002 | Akishita et al. | .......... | 707/501.1 |
| 2003/0167463 A1* | 9/2003 | Munsil et al. | ................ | 717/170 |
| 2004/0010786 A1* | 1/2004 | Cool et al. | ................... | 717/170 |
| 2004/0025058 A1* | 2/2004 | Kuriya et al. | ................ | 713/201 |
| 2004/0205749 A1* | 10/2004 | Dalton et al. | ................ | 717/178 |
| 2005/0044401 A1* | 2/2005 | Morrow et al. | .............. | 713/200 |

FOREIGN PATENT DOCUMENTS

| | | |
|---|---|---|
| JP | 7-319691 | 12/1995 |
| JP | 8-44630 | 2/1996 |
| JP | 8-137686 | 5/1996 |
| JP | 2001-243079 | 9/2001 |

(Continued)

OTHER PUBLICATIONS

"Experiences with the enforcement of access rights extracted from ODRL-based digital contracts", Guth et al., Oct. 2003, pp. 90-102, <http://delivery.acm.org/10.1145/950000/947392/p90-guth.pdf>.*

(Continued)

*Primary Examiner*—Tuan Q Dam
*Assistant Examiner*—Thuy Dao
(74) *Attorney, Agent, or Firm*—Oblon, Spivak, McClelland, Maier & Neustadt, L.L.P.

(57) ABSTRACT

An information processing apparatus is described which includes a list fetching section for fetching, from outside, a list of disabled contents information indicating disabling execution of an application program, when the contents data is subjected to a contents data reproducing/copying process for at least reproducing or copying the contents data. When it is determined that a type and/or a version of the application program identified by referring to the starting file corresponds to a type and/or a version of any disabled application program described in the list of disabled contents information, the starting file is not distributed to the application program.

11 Claims, 10 Drawing Sheets

FOREIGN PATENT DOCUMENTS

JP        2004-46307        2/2004

OTHER PUBLICATIONS

"A Digital Rights Management DRM security architecture for home networks", Popescu et al., Oct. 2004, pp. 1-10, <http://delivery.acm.org/10.1145/1030000/1029150/p1-popescu.pdf>.*

"Digital rights management for content distribution", Liu et al., Jan. 2003, pp. 49-58, <http://delivery.acm.org/10.1145/830000/827994/p49-liu.pdf>.*

"Privacy protection for signed media files: a separation-of-duty approach to the lightweight DRM (LWDRM) system", Grimm et al., Sep. 2004, pp. 93-99, <http://delivery.acm.org/10.1145/1030000/1022449/p93-grimm.pdf>.*

* cited by examiner

FIG. 5

SUBSCRIPTION TABLE

| CID | APPLICATION IDENTIFIER | VERSION IDENTIFIER | REGISTRATION TIME |
|---|---|---|---|
| 501-1 — 123456789 | aaa | 1.0.02.12345 | 18:15:10:000 |
| 501-2 — 123456788 | aaa | 1.0.02.12345 | 18:15:10:010 |
| 501-3 — 012345678 | aaa | 1.0.03.12345 | 18:15:10:020 |
| ······· | ······· | ······· | ······· |

FIG. 6A

| STARTING FILE (EXTENSION ".abc") | |
|---|---|
| CID | DISTRIBUTION URL |
| 123456789 | — |
| 123456788 | — |
| 012345678 | — |
| ... | ... |

FIG. 6B

| STARTING FILE (EXTENSION ".abc") | |
|---|---|
| CID | DISTRIBUTION URL |
| — | http://contents_server.hostname.com/folders/identifier00000.oma |
| — | http://contents_server.hostname.com/folders/identifier00001.oma |
| — | http://contents_server.hostname.com/folders/identifier00003.oma |
| ... | ... |

FIG. 7

| | |
|---|---|
| DATA TOTAL SIZE | (4byte) |
| ⎡ APPLICATION ID CODE [0x0001] | (2byte) |
|    APPLICATION NAME | (DATA SIZE) |
|    VERSION ID CODE [0x0002] | (2byte) |
|    DESCRIPTION OF VERSION | (DATA SIZE) |
| 701 ⎨ | |
|    MESSAGE ID CODE [0x0101] | (2byte) |
|    MESSAGE CHARACTER STRING | (DATA SIZE) |
|    URL ID CODE [0x0102] | (2byte) |
| ⎣ URL CHARACTER STRING | (DATA SIZE) |

(※ DISABLED CONTENTS INFORMATION 701 CAN BE DESCRIBED IN REPETITION)

INFORMATION PROCESSING APPARATUS, EXECUTABILITY DETERMINING METHOD, AND COMPUTER PROGRAM FOR THE SAME

BACKGROUND OF THE INVENTION

The present invention relates to an information processing apparatus and an executability determining method for determining whether execution of an application program is enabled or disabled, and also to a computer program for the same.

There are the services for distributing various types of contents data such as software, video data, or music data through a network or for providing reproducible contents data stored in a large capacity storage medium such as a CD-ROM to users.

The users can select desired contents data and also download contents data through a network by carrying out a specified procedure or copy the contents data recorded in a hard disk of a, recording medium in a PC (Personal Computer).

When contents data such as music data or video data is downloaded through a network or copied from a recording medium or the like as described above, it is necessary to install a predetermined application (software or an application program) in each user's terminal such as a PC, and also it is necessary to update a version, even after installation thereof, in response to an OS or an environment for operations thereof.

Patent document: Japanese Patent Laid-Open No. 2002-318692

However, types of applications are different according to networks or recording media employing for providing contents data, and also versions are updated from time to time, and therefore it is always difficult for a user to determine whether or not applications installed in the user's terminal such as a PC can be used.

SUMMARY OF THE INVENTION

The present invention was made to solve the problems as described above, and an object of the present invention is to provide a novel and improved information processing apparatus and an executability determining method and a computer program for the same which enables prevention of execution of an inappropriate application program.

According to an embodiment of the present invention, there is provided an information processing apparatus for storing therein an application program for processing contents data. The information processing apparatus includes a list fetching section for fetching from outside disabled contents list information indicating disabled contents information disabling execution of an application program, when the contents data is subjected to a contents data reproducing/copying process for at least reproducing or copying the contents data, including a type and/or a version of the application program; and a verifying section for verifying a type and/or a version of an application program identified by referring to a starting file fetched together with the disabled contents list from the outside to at least one or more disabled contents information described in the disabled contents list information. When it is determined as a result of verification that a type and/or a version of the application program identified by referring to the starting file corresponds to a type and/or a version of any disabled application program described in the disabled contents list information, the starting file is not distributed to the application program.

With the present invention, when contents data is at least reproduced or copied, at least one of a type and a version of an application program for processing the contents data is verified to at least one of a type and a version of each application program included in disabled contents information. With the configuration as described above, when at least one of the type and version of the application program matches to that of any application program included in the disabled contents information, execution of the processing for the contents data is prevented because a starting file is not allocated to the corresponding application program identified through verification. The "outside" as used herein indicates, for instance, a Web server or the like present on a network.

The information processing apparatus may have the configuration in which, when it is determined as a result of verification that a type and/or a version of an application program identified by referring to a starting file matches a type and/or a version of any application program included in disabled contents information described in disabled contents list information, said starting file is deleted.

The information processing apparatus may further include a presence information fetching section for fetching, from the disabled contents information, presence information indicating presence of specified information for installing an application program not corresponding to any application program included in disabled contents information in the disabled contents information.

The specified information may be necessary for installing an application program of a newer version as compared to that of the corresponding application program included in the disabled contents information. With the configuration, installment of an appropriate application program not corresponding to any application program included in the disabled contents information can efficiently be guided.

The configuration may be allowable in which a type and/or a version of a application program is identified for each contents data by referring to a starting file, and the verifying section verifies a type and/or a version of the identified application program to the disabled contents information. With the configuration as described above, executability of each discrete application program can be determined more precisely at a level of contents data unit.

The disabled contents list information may dynamically be generated for each contents data unit in response to a demand from the list fetching section. With the configuration as described above, by describing, each time a bug or the like is found in an application program, the application program in the disabled contents information, execution of the application program can quickly and efficiently be prevented.

Further the configuration may be allowable in which a type and/or a version of an application program are identified by referring to an extension of a file name, a registry, or an contents data identifier added to each contents data unit included in the starting file.

Also the configuration may be allowable in which a starting file is dynamically generated when contents data is reproduced or copied.

According to an embodiment of the present invention, there is provided an executability determining method for enabling/disabling an application program for processing contents data including the steps of fetching disabled contents list information indicating disabled contents information in the list form including types and/or versions of application programs each with execution thereof disabled in contents data reproducing/copying processing for at least reproducing or copying the contents data; and verifying a type and/or a version of an application program identified by referring to a starting file fetched together with the disabled contents list information from the outside to at least one or more disabled contents information described in the disabled contents list information. When it is determined as a result of the verification above that the type and/or version of the application program identified by referring to the starting file correspond to a type and/or a version of any application programs for disabled contents information described in the disabled contents list information, the starting file is not distributed to the application program.

When it is determined as a result of verification that a type and/or a version of an application program identified by referring to the starting file matches a type and/or a version of an application program in disabled contents information described in the disabled contents list information, presence information indicating presence of specified information for installing an application program not corresponding to any application program in disabled contents information described in the disabled contents information is fetched from the disabled contents information.

According to an embodiment of the present invention, there is provided a computer program for making an information processing apparatus execute an executability determining method for enabling/disabling execution of an application program for processing contents data. The executability determining method includes the steps of fetching disabled contents list information indicating disabled contents information in the list form including types and/or versions of application programs each with execution thereof disabled in contents data reproducing/copying processing for at least reproducing or copying the contents data; and verifying a type and/or a version of an application program identified by referring to a starting file fetched together with the disabled contents list information from the outside to at least one or more disabled contents information described in the disabled contents list information. When it is determined as a result of the verification above that the type and/or version of the application program identified by referring to the starting file correspond to a type and/or a version of any application programs for disabled contents information described in the disabled contents list information, the starting file is not distributed to the application program.

As described above, with the present invention, an application including inappropriate contents data to be processed is identified from a type and a version of the application, whereby it is possible to prevent execution of contents data by the application.

The present invention can be applied to an information processing apparatus, an executability determining method capable of determining executability of an application program, and a computer program for the same.

BRIEF DESCRIPTION OF THE DRAWINGS

FIG. 5 is an explanatory view showing a general structure of a subscription table according to the embodiment;

FIGS. 6A and 6B are explanatory views showing schematic data structures in a starting file according to the embodiment;

FIG. 7 is an explanatory view showing a general data structure of disabled contents list information according to the embodiment;

DETAILED DESCRIPTION OF PREFERRED EMBODIMENTS

A preferred embodiment of the present invention will be described in detail with reference to the drawings. In the following description and drawings, the same symbols are assigned to the components having the substantially same function and configuration, and duplicated description thereof is omitted herefrom.

Figure 1:
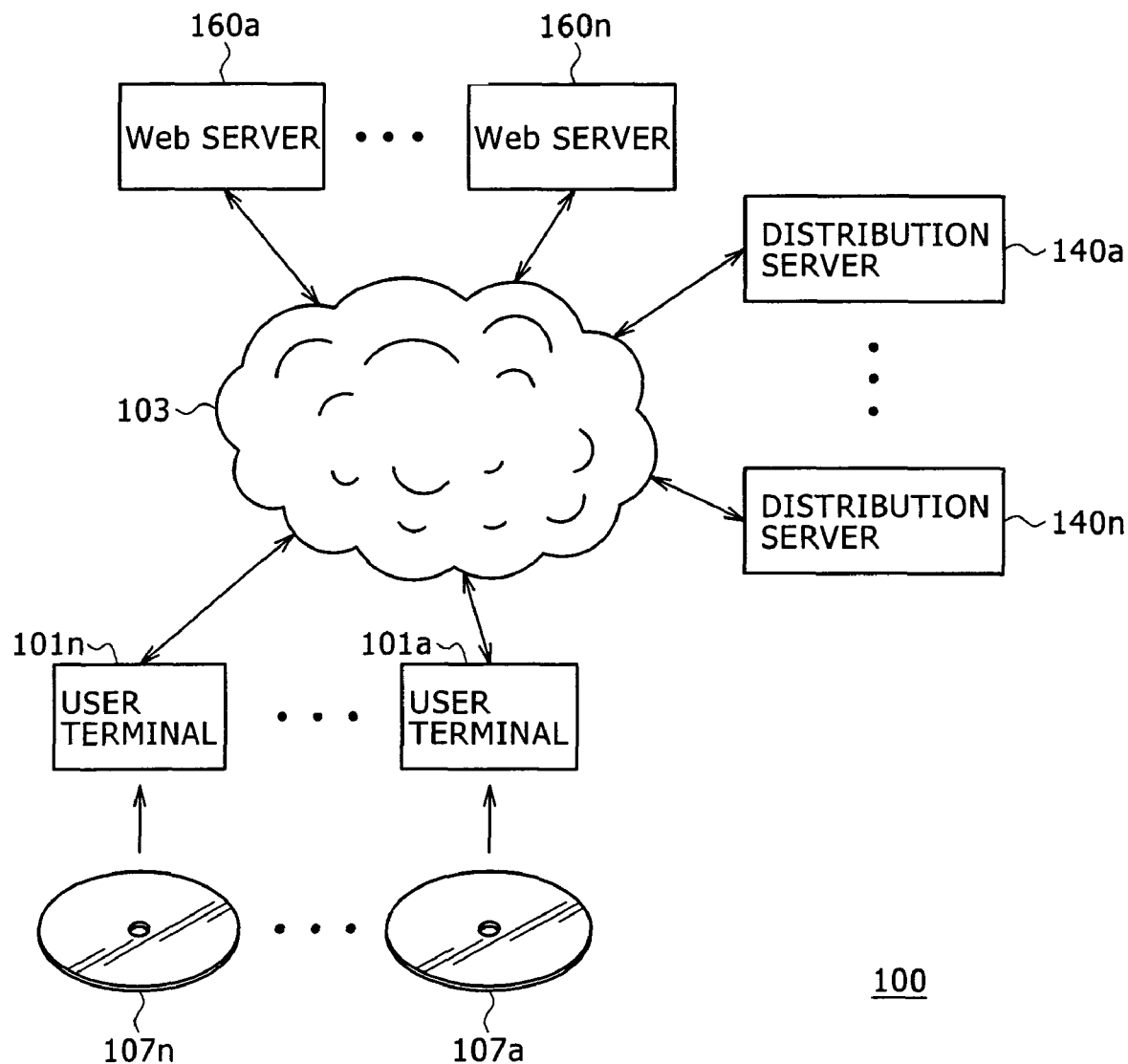
FIG. 1 is a block diagram showing a schematic configuration of an application program executability determining system according to an embodiment of the present invention.

First of all, an application program executability determining system 100 in this embodiment is described with reference to FIG. 1. FIG. 1 is a block diagram showing general configuration of the application program executability determining system 100 in this embodiment.

Copy rights management systems using the DRM (Digital Rights Management) technique, which impose limitations on distribution and use of contents, have been becoming more and more widespread.

Including the application program executability determining system 100 according to this embodiment, such copy rights management systems introduce restrictions over illegal operations for copying the contents by strictly managing the number of copies of original contents as proposed by the SDMI (Secure Digital Music Initiative).

The application program executability determining system 100 in this embodiment will be described below by referring to a case as an example where there the application program executability determining system 100 contains two types of application programs, namely, an application program for distributing contents data from a distribution server, 140 to a user terminal 101 (information processing apparatus) via a network, for instance, for processing the contents data (hereinafter may be referred to as an EMD application), and an application program for processing contents data previously recorded on a recording medium 107 (hereinafter may also be referred to as a recording medium application program). However, the present invention is not limited to the configuration as described above, and the application program executability determining system 100 may also contain, for instance, an application program for processing contents data such as streaming. The term "processing contents data" as used herein means collectively, for instance, copying, transmitting, downloading, and reproducing the contents data.

As shown in FIG. 1, the application program executability determining system 100 includes, for instance, one or more user terminal(s) 101a, 101b, . . . , and 101n (hereinafter may collectively be referred to as "user terminals 101" hereinafter), distribution servers 140a, 140b, . . . , and 140n, a network 103, and recording media 107a, 107b, . . . , 107n. The network 103 connects the user terminals with the distribution servers.

The user terminals 101 may be various types of recording/reproducing devices, recording dedicated devices, or reproducing dedicated devices, with which contents data such as image or audio data can be recorded/reproduced on/from recording media 107 and an incorporated storage. More specifically, user terminals 101 may be computers such as personal computers (regardless of laptop type or desktop type).

In the user terminal 101 according to this embodiment, a recording/reproducing device for recording or reproducing the recording medium 107 may be incorporated into or externally connected to a PDA (personal digital assistant), a portable type image player/recorder, a portable type audio player/recorder such as an IC recorder, an imaging device such as a digital camera or a video recorder, a home video game machine, a radio receiver, a cell phone, a PHS, an intelligent home appliance, or a video tape recorder. Further, also the configuration is allowable in which a storage device such as a HDD (hard disk drive) is incorporated in or externally connected to a CD or DVD recorder/player.

This user terminal 101 can copy contents data recorded on a recording medium 107 in a HDD or the like, for instance, by self-recording (self sound recording/picture recording) or ripping, and further can prepare and record new contents data. The term "self-recording" as used herein means to record sound/picture collected/imaged with a sound collector or an imaging device incorporated in the user terminal 101 itself as audio data/image data. The term "ripping" as used herein means to extract digital contents data (sound data, video data or the like) recorded on a recording medium such as a music CD or a video DVD and to record the data by converting the data into a file format processible on a computer.

Further the user terminal 101 can record contents data distributed from a distribution server 140 on a recording device such as a storage device or a recording medium 107. Similarly, the user terminal 101 can reproduce contents data copied or prepared in the way as described above, and distributed contents data.

The user terminal 101 in this embodiment includes a component for checking whether an application program to be executed on the user terminal 101 is appropriate or not, for instance, when copying contents data recorded on a recording medium 107 and recording the data onto a HDD or the like, and the component is described in detail hereinafter.

A distribution server 140 is a server used for contents distribution services such as electronic music distribution (EMD), and is configured with a computer and the like having a server function. This distribution server 140 can distribute contents data to the user terminal 101 as a client via a network 103.

The distribution server 140 can distribute music contents by compressing the music data, for instance, into MP3 (MPEG audio layer-3) format or ATRAC3 format.

The network 103 is a communication network which connects a plurality of user terminals 101, distribution servers 140, and web servers 160 so as to communicate with each other in the interactive way; and is typically a public line network such as the Internet connecting users' terminals by the method such as ADSL (asymmetric digital subscriber line), FTTH (fiber to the home) or the like; but also includes a closed line network, such as WAN, LAN, IP-VPN. Connection media for the purpose include optical fiber cables based on FDDI (fiber distributed data interface), coaxial cables or twisted pair cables for Ethernet (trademark), and wireless connection based on IEEE 802.11b and the like, regardless of whether wired or wireless, and also include satellite communication networks.

The recording medium 107 is a removable medium capable of storing therein various types of contents data such as sound source (music) data and image data, and includes, but not limited to, for instance, various types of optical disks such as a DVD-R, a DVD-RW, a DVD-RAM, a CD-R, a CD-RW, and a magnetic optical disk; various types of magnetic disks such as a flexible disk and a hard disk; and various types of semiconductor memories. This recording medium 107 may be a recording medium with copyrights management function for limiting copying and reproduction of contents data, for instance, by using encoded keys.

When web information is requested from a user terminal 101 via the network 103, a web server 160 transmits the corresponding web information to the user terminal 101. The Web information may be data prepared in a SGML format, for instance, HTML or XML, but is not limited to this example.

Furthermore, the web server 160 stores therein starting files, for instance, for each contents data unit, and when a starting file corresponding to requested contents data is requested from a user terminal 101, the web server 160 transmits the corresponding starting file via the network 103. As the user terminal 101 receives the starting file corresponding to the contents data, the contents data can be processed, for instance, by copying and/or transmitting the data to another device. The term "processing" of contents data as used herein generically means copying, transmission, downloading, and reproduction, while a starting file as used herein means a file or the like to be used for starting, for instance, an application program. In the starting file, information for identifying the contents data to be downloaded or the like is described, for instance, in XML format for each contents data unit. The information for identifying the contents data may include, for instance, contents identification information, contents URL information, and license identifying information and its URL information to be required when requesting the contents data as described above.

Further, the web server 160 additionally transmits disabled contents list information when transmitting the starting file described above to the user terminal 101. This disabled contents list information includes disabled contents information including application program identifiers and version identifiers of application programs inappropriate to be executed when processing the contents data on the user terminal 101. The term "application program" as used herein means one or more program modules necessary for achieving a specific purpose such as making the user terminal 101 process contents data. The starting file, disabled contents information, and disabled contents list information are described in detail hereinafter.

The disabled contents list information in this embodiment is operable in a case where the disabled contents list information is transmitted to the user terminal 101 separately from, for instance, the starting file, as well as in a case where only the starting file is transmitted to the user terminal 101, with the disabled contents list information being included in the starting file.

Figure 2:
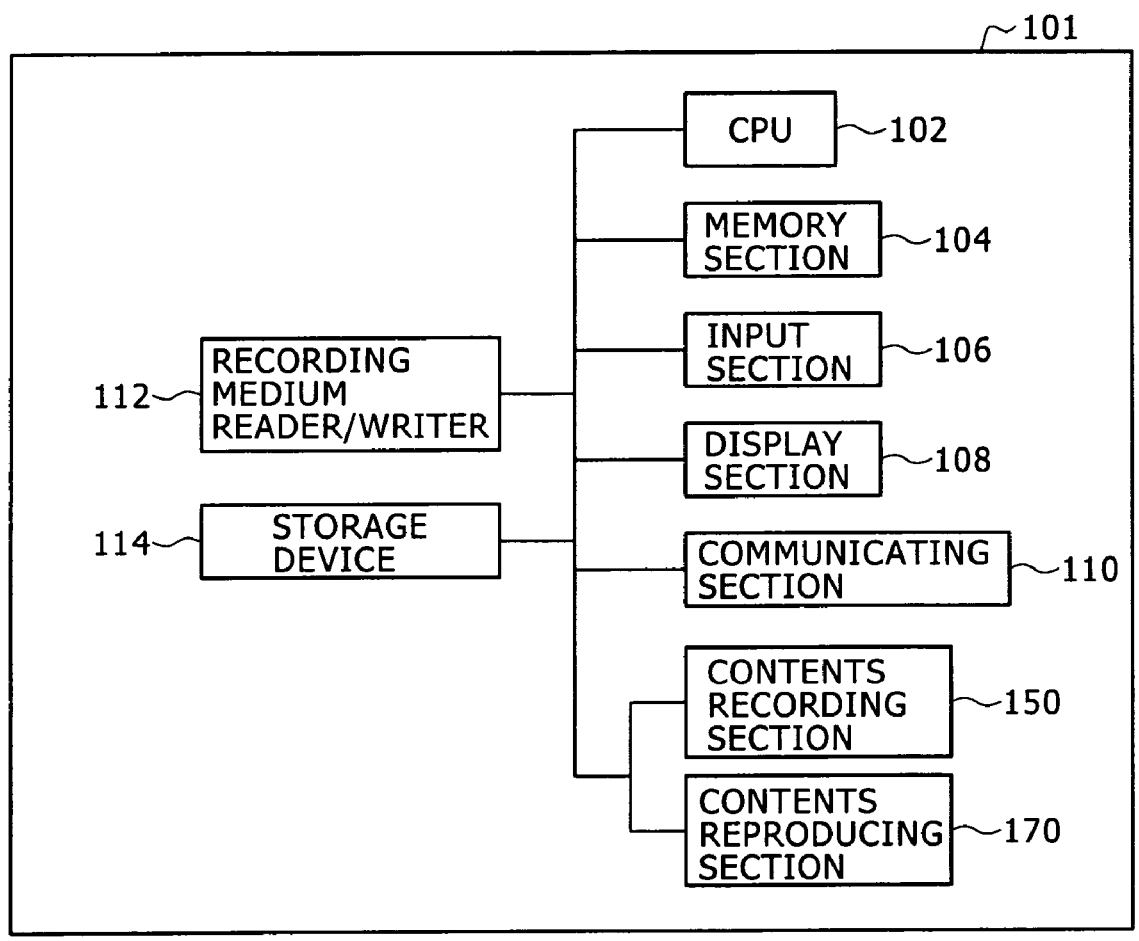
FIG. 2 is a block diagram schematically showing configuration of a user terminal according to the embodiment.

Next, configuration of the user terminal 101 according to this embodiment is described in detail with reference to FIG. 2. FIG. 2 is a block diagram schematically showing general configuration of the user terminal 101 in this embodiment. FIG. 2 shows an example of configuration of the user terminal 101 configured with the PC as described above or the like.

As shown in FIG. 2, the user terminal 101 includes, for instance, a CPU 102, a memory section 104, a input section 106, a display section 108, a communicating section 110, a storage device 114, a contents recording section 150, and a contents reproducing section 170.

The CPU 102 functions as a processor and a controller capable of controlling the process in each section within the user terminal 101. The memory section 104 includes, for instance, a RAM, a ROM, a cache memory, and the like, and has a function of temporarily storing various data involved in processes by the CPU 102, operation programs and commands for the CPU 102, and the like.

The input section 106 includes operating units such as a mouse, a keyboard, a touch panel, buttons, switches, lever(s); an input control circuit for generating input signals and outputting the signals to the CPU 102; and the like. A user of the user terminal 101 can input various data into the user terminal 101 and also can input various commands for processing the data.

The display section 108 is configured with, for instance, a CRT display, a liquid crystal display (LCD), a display unit such as a lamp, and an audio output device such as a speaker. This display section 108 can output contents data reproduced by a contents reproducing section 170 described later. Specifically, the display unit shows thereon reproduced image data, electronic books, games, and GUI for various software. On the other hand, the audio output device can pronounce reproduced voice data. If contents data dealt with the user terminal 101 is only audio data, the display unit is not necessary, while the audio output device is not necessary when the contents data is only image data.

The communicating section 110 is a communication interface configured with, for instance, a communication line, a communication circuit, a communication device, and the like. This communicating section 110 is capable of transmitting and receiving various data such as contents data, starting files, disabled contents list information, and control signals to and from a web server 160 or a distribution server 140 via the network 103.

The storage device 114 is a device for storing data therein configured with, for instance, a hard disk drive (HDD), a flash memory and the like, and is capable of storing various data such as application programs, and contents data therein.

This storage device 114 is configured as a storage unit according to this embodiment. Namely, in the storage device 114 stores therein various data such as contents data copied from recording media 107 or downloaded via the network 103, and application programs for processing the contents data. This storage device 114 may be incorporated into the user terminal 101, or may also be connected externally thereto.

The contents recording section 150 can record contents data, such as data received via the network 103 and contents data read from a recording medium 107, onto the storage device 114 or the like, by controlling, for instance, the storage device 114 or the recording medium reader/writer 112.

The recording medium reader/writer 112 is a device for recoding/reproducing various data such as contents data, for instance, on or from recording media 107. This recording medium reader/writer 112 is configured with, for instance, a disk device such as a optical disk drive when the recording medium 107 is an optical disk; or with a semiconductor memory reader/writer when the recording medium 107 is a semiconductor memory. This recording medium reader/writer 112 may be, for instance, incorporated into the user terminal 101, or may also be connected externally thereto.

The contents reproducing section 170 can reproduce contents data, such as data received via the network 103 and contents data read from a recording medium 107, by controlling, for instance, the storage device 114 or the recording medium reader/writer 112.

The contents reproducing section 170 is configured with a reproducing device having a contents reproducing function and/or with contents reproducing software installed into the user terminal 101, and can reproduce various contents data.

The contents data reproduced by the contents reproducing section 170 is outputted from the display section 108.

The contents recording sections 150 and the contents reproducing sections 170 may be activated and executed on two or more user terminals 101 simultaneously.

The contents recording section 150, contents reproducing section 170 and other components are described above with reference to a case where the components are configured by software, but the present invention is not limited to this configuration, and the components may be configured with, for instance, hardware having the functions described above.

Figure 3:
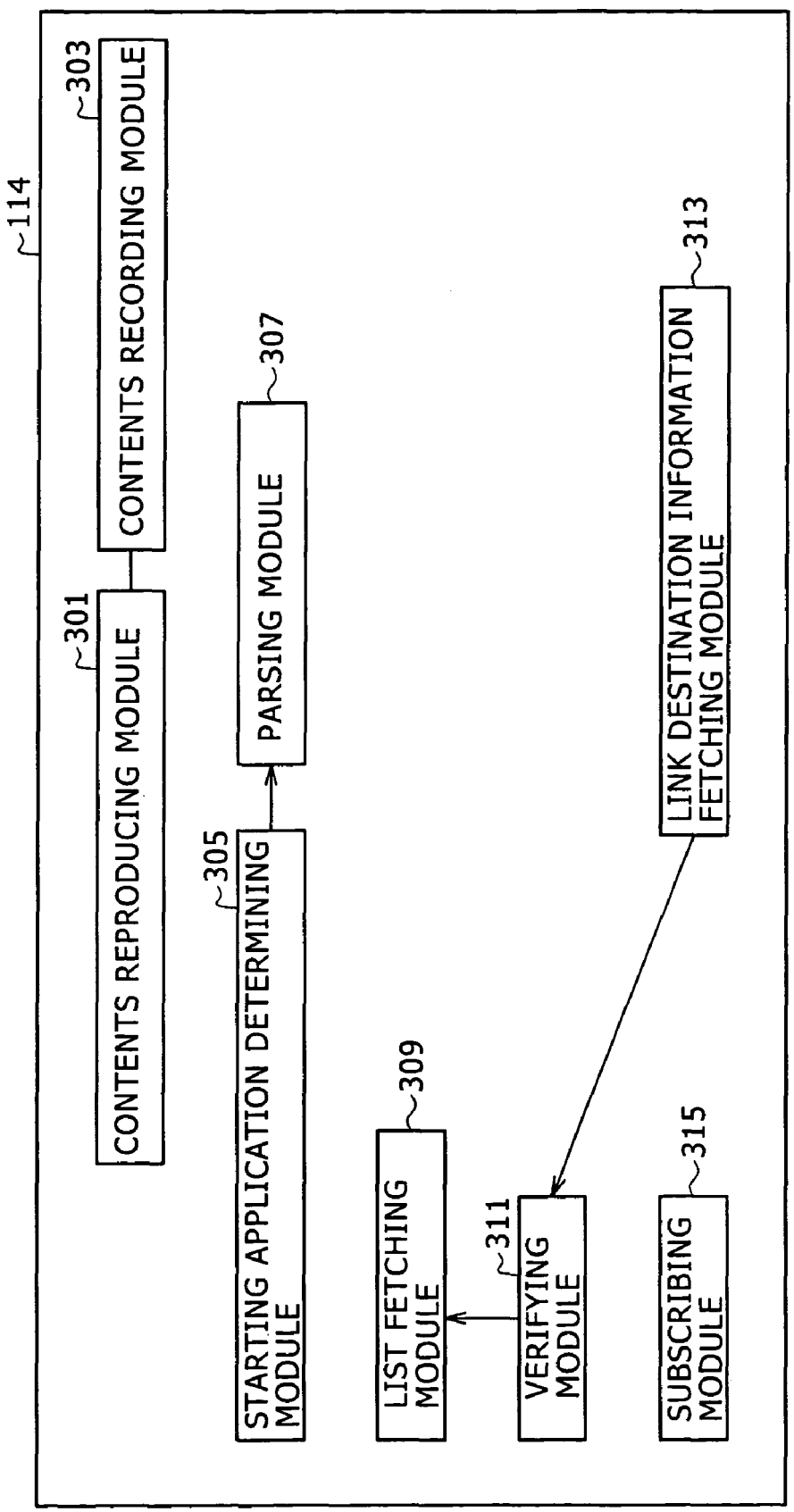
FIG. 3 is a block diagram showing configuration of a series of program modules to be started on the user terminal according to the embodiment.

Next, program modules for determining executability of application programs to be executed on a user terminal 101 in this embodiment are described with reference to FIG. 3. FIG. 3 is a block diagram showing a group of program modules to be started on a user terminal 101 according to this embodiment.

The group of program modules according to this embodiment is stored into the storage device 114, and started in response to a command from the CPU 102 or the like. The program module is stored by installing it into the storage device 114, for instance, with an installer; but the configuration is not limited to this example, and the program module may be, for instance, an applet capable of being processed by directly accessing the server without installation.

As shown in FIG. 3, the group of program modules in this embodiment is configured with a contents reproducing module 301 (the contents reproducing section 170), a contents recording module 303 (the contents recording section 150), a starting application program determining module 305, an parsing module 307, a list fetching module (a list fetching section) 309, a verifying module (a verifying section) 311, a link destination information fetching module (a location information fetching section) 313, and a subscribing module 315.

The contents reproducing module 301 is the contents reproducing section 170 described above, which is a module for reproducing various contents data. The contents reproducing module 301 is provided, for instance, with a function to compress/extend contents data according to the necessity.

The contents recording module 303 is the contents recording section 150 described above, which is a module for recording various contents data onto the storage device 114 and the like. The contents recording module 303 is provided with a function to compress contents data according to the necessity.

The parsing module 307 is a module for parsing specified data such as a starting file described below and for outputting the parsing result in response to an external call.

The starting application program determining module 305 is a module for determining what application program is to be started in order to process contents data based on the result of parsing by the parsing module 307. The process of determining the starting application program is described hereinafter.

The list fetching module 309 is a module for fetching the disabled contents list information transmitted from the web server 160. The fetched disabled contents list information is referred by a verifying module 311 described below.

The verifying module 311 is a module for verifying whether or not the disabled contents list information including an application program and/or version described in the disabled contents list information fetched by the list fetching module 309 corresponds to the starting application program and/or version subscribed in the user terminal 101. As a result of verification, the corresponding starting application program in the user terminal 101 is not allowed to be executed as it is.

Namely, a list of application programs described in the disabled contents list information described above indicates application programs that are not allowed to be executed in the user terminal 101. Since the application program cannot be executed as it is, a certain process is required such as upgrading of the version of the application program.

The link destination information fetching module 313 is invoked by the verifying module 311 in response to the result of verification, and fetches location information and the like indicating the location where an installer is stored for upgrading the version of the application program for processing the contents data stored in the user terminal 101. The location information and the like are described in the starting file.

The subscribing module 315 is a module to be activated for, for instance, copying a contents data recorded on a recording medium 107. When activated, the subscribing module 315 stores therein a set of subscription information including contents identification information identifying the contents data recorded on the recording medium 107, application program identification information identifying the application program, and version identification information identifying the version, into a subscription table with respect to each contents data. The subscription table and the subscription information are described below.

Figure 4:
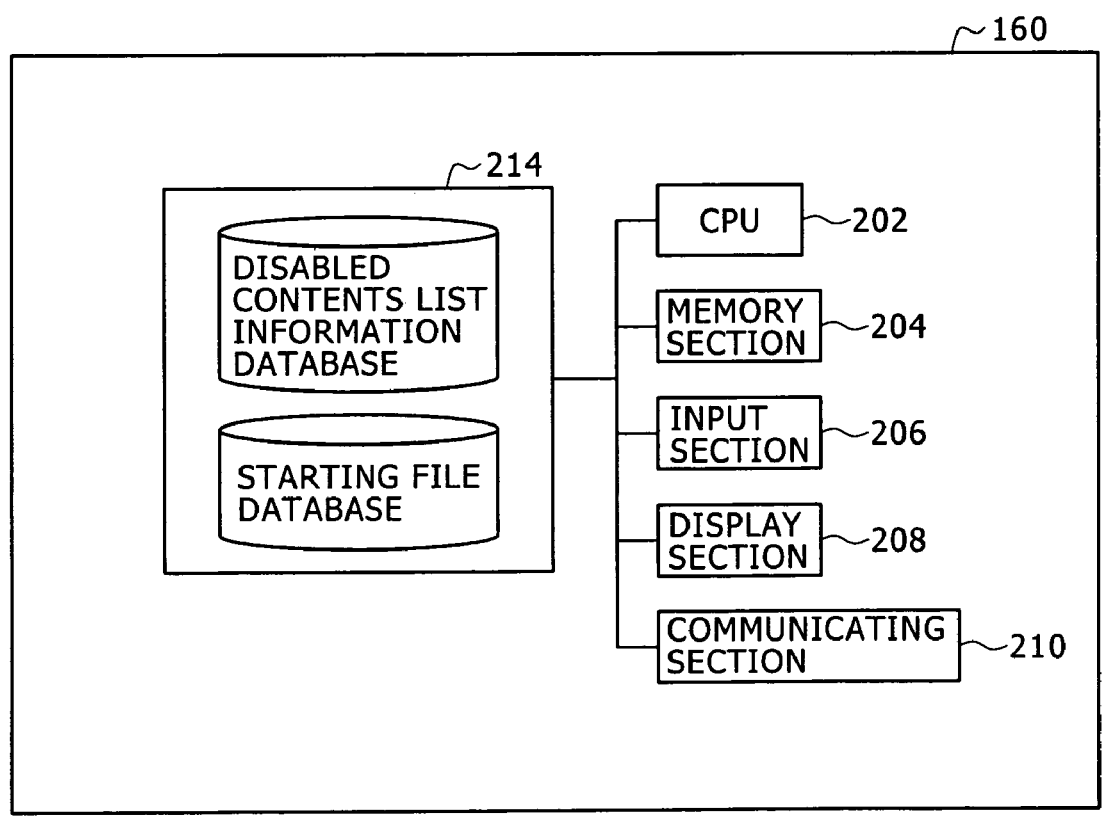
FIG. 4 is a block diagram schematically showing configuration of a web server according to the embodiment.

Next, the web server 160 in this embodiment is described in detail with reference to FIG. 4. FIG. 4 is a block diagram schematically showing the configuration of the web server 160 according to this embodiment.

As shown in FIG. 4, the web server 160 includes, for instance, a CPU 202, a memory section 204, an input section 206, a display section 208, a communicating device 210, and a storage 214.

The CPU 202 functions as a processor and a controller capable of controlling the process in each section of the web server 160. The memory section 204 includes, for instance, RAM, ROM, cache memory, and the like, having a function of temporarily storing various data involved in processes by the CPU 202, operation programs for the CPU 202, and the like.

The communicating device 210 is a communication interface configured with, for instance, a communication line, a communication circuit, a communication device, and the like. The communicating device 210 is capable of transmitting and receiving the starting file, disabled contents list information, various control signals, and the like between the web server 160 and external equipment such as user terminals 101 via the network 103.

The storage 214 is a device for data storage configured with, for instance, an HDD and the like, and capable of storing various data such as programs. The storage 214 stores, for instance, the disabled contents list information database (disabled contents list information DB) and the starting file database (starting file DB).

The disabled contents list information database recorded in the storage 214 previously stores therein one or more sets of disabled contents list information. The disabled contents list information is stored in the disabled contents list information database as being linked to location information such as URL and the like. This allows for reading out the disabled contents list information from disabled contents list information database by using the URL and the like as a key.

Further, the explanation was given above by referring to the case where one or more sets of the disabled contents list information are stored in the disabled contents list information database as being linked to the location information, but the present invention is not limited to this configuration, and also the present invention can be carried out with the configuration in which the disabled contents list information is dynamically generated in response to a calling for the corresponding disabled contents list information by using the URL and the like as a key. Even immediately after it is found out in association with the dynamic generation that the application is an inappropriate one, if an identifier or version of the applicable application program is dynamically reflected to the disabled contents list information, it is possible to quickly prevent the application program from being started.

The starting file DB stored in the storage 214 previously stores one or more the starting files. The starting file is stored in the starting file DB linked to each location information such as the aforementioned URL. As a result, the starting file can be read out, for instance, by the URL as a key.

The explanation was given above by referring to the case where the starting file is stored in the starting file DB as being linked to the location information in advance, and also the present invention can be carried out with the configuration in which the starting file is dynamically generated when the corresponding starting file is called by using the URL and the like as a key.

Next, the data configuration in this embodiment is explained with reference to FIGS. 5 to 7. FIG. 5 is an explanatory view showing a general structure of the subscription table in this embodiment; FIG. 6 is an explanatory view showing general data configuration of the starting file in this embodiment, and FIG. 7 is an explanatory view showing general data configuration of the disabled contents list information in this embodiment.

At first, as shown in FIG. 5, the subscription table according to this embodiment stores therein one or more sets of the subscription information 501 (501-1, 501-2, 501-3). The subscription information 501 includes contents identification information (contents data identifier, CID), an application program identifier identifying an application program, a version identifier identifying a version of the application program, and registration time indicating the time when the subscription information is registered to the subscription table.

For instance, the subscription information 501-1 includes a set of information having the CID of "123456789", application program identifier of "aaa", version identifier of "1.0.02.12345", and registration time of "18:15:10:000". The subscription information is not limited to this example, but the subscription information 501 may include at least one of the CID, application program identifier, version identifier, and registration time, or may be configured with an application program identifier and a version identifier.

To copy such as sound source data recorded on a recording medium 107 into the storage device 114, the recording medium 107 is inserted into the recording medium reader/writer 112 for storing the application program identifier and version identifier of the application program started by auto-run and the CID and the like recorded on the original recording medium 107 in the subscription table as subscription information.

The explanation was given with, but not limited to, the case where the subscription table in this embodiment stores the subscription information with respect to each CID applied to each contents data, and the execution is possible even when the subscription information is stored in the subscription table with respect to each recording medium 107.

Next, as shown in FIG. 6, there are two different types of starting files each as a starting file according to this embodiment. The starting file shown in FIG. 6A has an extension ".abc", which is a file for starting the recording medium application program (hereinafter may also be referred to as a recording medium starting file). The example was given above by referring to a case in which the file according to this embodiment has the extension of ".abc", but the present invention is not limited to this configuration.

In the recording medium starting file, a CID to be actually processed by the contents data in the user terminal 101 is described. Therefore, as shown in FIG. 6A, for instance, when three contents data are copied in the storage device 114, CIDs such as "123456789", "123456788", "012345678", and the like are described in the starting file.

The starting file shown in FIG. 6B is common with the recording medium starting file shown in FIG. 6A in the point of having the extension of ".abc", but is different in the point that a distribution URL (Content URL) indicating the location where the original contents data exists is described in the starting file shown in FIG. 6B. The recording medium starting file shown in FIG. 6B is explained by referring to a case in which the CID is not described, but CID(s) may be described therein.

The starting file shown in FIG. 6B is a file for starting the EMD application program (hereinafter may be referred to as an EMD starting file). The URL of the distributor is described for each distributed contents data. The explanation was given above by referring to a case where a URL is used to indicate the location of the contents data at the distributors, but the present invention is not limited to this configuration.

In the case where, for instance, the contents data is downloaded with an EMD application program instead of the recording medium application program, when a user selects desired contents data from a web page on a web site separately, the user terminal 101 receives the EMD starting file and accesses the distribution server 140 based on the EMD starting file to receive the applicable contents data. In a case of the recording medium application program, the user selects the contents data recorded on the recording medium by a contents purchasing function programmed in the application program.

The term "access" as used herein generically means the information process of processing information through the network such as use of the system, connection to a web server and the like, reference to a file, saving a file, deleting a file, or modifying of a file.

Next, the disabled contents list information in the embodiment of the present invention is described with reference to FIG. 7. The data configuration of the disabled contents list information includes, as shown in FIG. 7, the total data size of the disabled contents list information, disabled contents information 701, and the like.

As shown in FIG. 7, the disabled contents information 701 is configured with items including an application program identification code (application program identifier) for identifying the application program, an application program name describing the name of the application program, version identification code (version identifier) for identifying the version of the application program, a version description describing the version, a message identification code for identifying the message, a message character string which is a string of characters describing the message, a URL identification code (URL identifier) for identifying the URL, and a URL character string (URL information; location information) indicating the URL. The disabled contents information 701 can be described repeatedly as many times as the number of the corresponding application programs. The "message identification code" and "message character string" may be omitted, and also "URL identification code" and "URL character string" may be omitted as well.

The disabled contents information 701 is configured with identification information for identifying inappropriate application program which is actually not allowed for the execution of the process, messages for notifying the user as needed, URL indicating the location of the information necessary for installing an appropriate application program, and the like.

Figure 8:
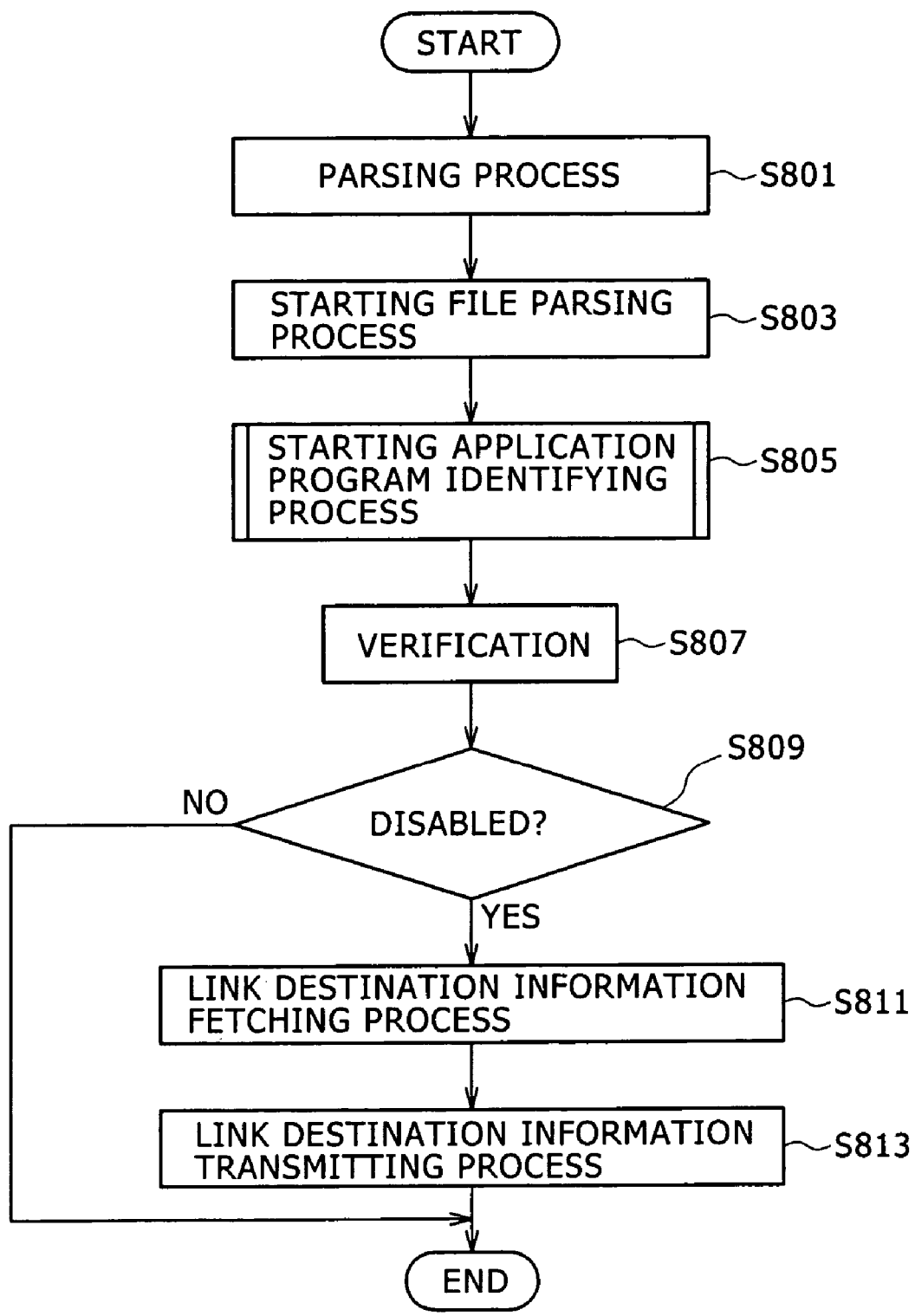
FIG. 8 is a flowchart showing an outline of an application determining process according to the embodiment.

Next, a determining process in this embodiment for determining whether an application program is appropriate or not is described with reference to FIG. 8. FIG. 8 is a flow chart showing an outline of the application program determining process according to this embodiment.

As shown in FIG. 8, the application program in the user terminal 101 at first receives the starting file from the web server 160 via the network 103, an argument indicating receipt of the starting file is passed to the parsing module 307, and then the parsing process is executed by the parsing module 307 (S801). The starting file is fetched by an application program such as a web browser installed in the user terminal 101.

In a case where the starting file according to this embodiment is a recording medium starting file, the subscribing process of the application is executed by the subscribing module 315 before the parsing process (S801) is executed, and the recording medium starting file is transmitted after the completion of the subscribing process. In a case where the starting file according to this embodiment is an EMD starting file, the subscribing process by the subscribing module 315 is not required, and the starting file is transmitted directly from the web server 160.

When a result of the parsing process by the parsing module 307 indicates that the argument is fetching of the starting file, the starting file parsing process is further executed by the parsing module 307 (S803).

The starting file parsing process (S803) is a preprocess for parsing in advance what extension the starting file has in order to execute the following starting application program identifying process (S805).

Next, the starting application program identifying process (S805) identifies the starting application program based on the result of parsing in the starting file parsing process (S803).

Figure 9:
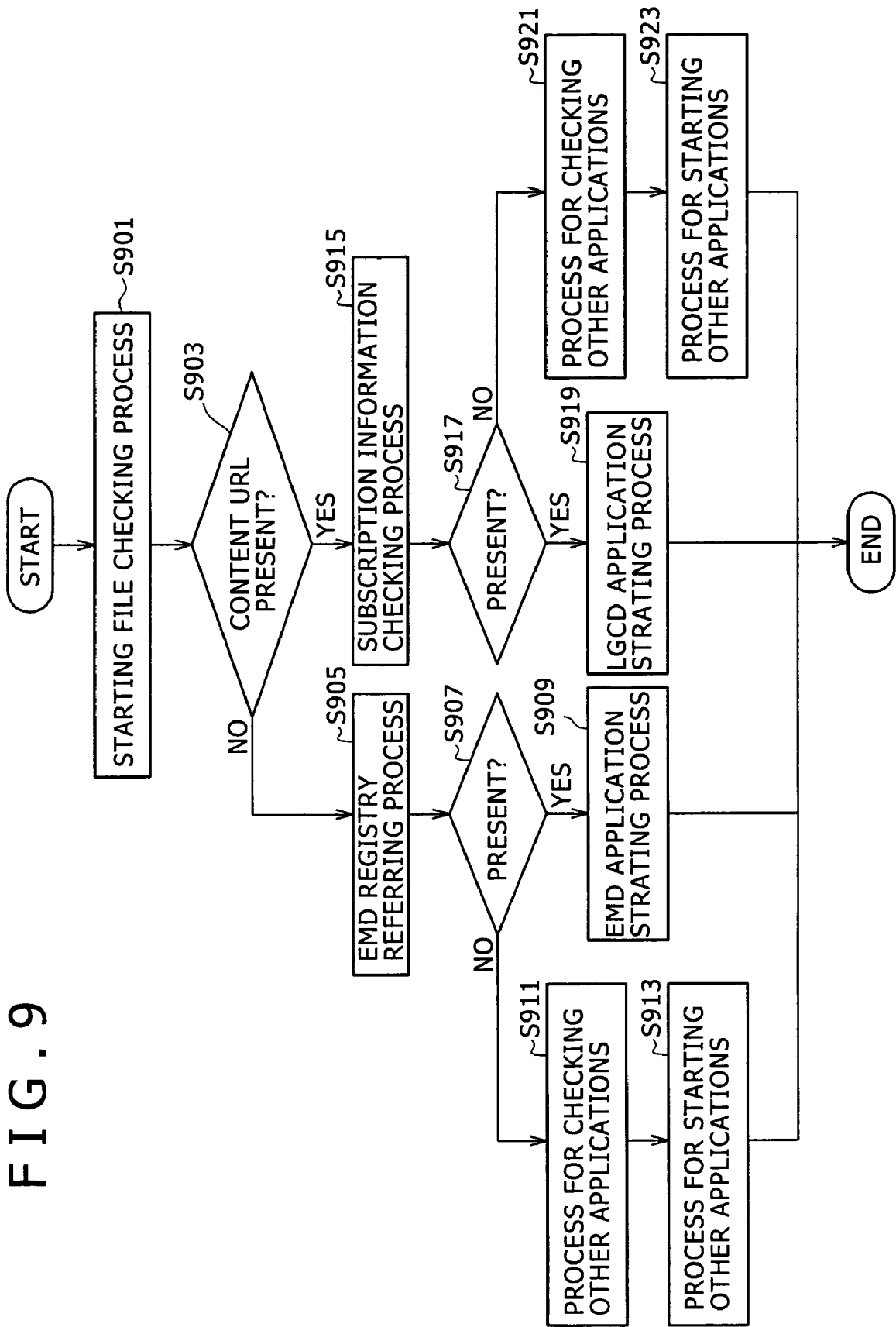
FIG. 9 is a flowchart showing an outline of a starting application program identifying process according to the embodiment.

A starting application program identifying process according to this embodiment is described with reference to FIG. 9. FIG. 9 is a flowchart showing an outline of the starting application program identifying process in this embodiment.

As shown in FIG. 9, a starting file checking process (S901) is made first in the starting application program identifying process in this embodiment. For instance, in the starting file checking process, presence of an extension for the starting file parsed in the starting file parsing process (S803) described above and the distribution URL (Content URL) is checked.

In a case where the Content URL is not present in the starting file (S903), the starting application program determining module 305 executes an EMD registry referring process (S905). The EMD registry is used for identifying the EMD application program, in which the identifying information such as the application program identifier is described at a time for instance when the EMD application program is installed to the user terminal 101.

In a case where such information is not described in the EMD registry as an application program identifier and a version identifier or the like used for identifying an application program (S907), the starting application program determining module 305 executes the application program checking process for checking whether other application programs are installed or not (S911).

In a case where the other application program checking process (S911) is executed and the corresponding application program to be installed is found, the corresponding application program is identified as an application program to be started for processing the contents data, and then the application program is started (S913).

Also in the EMD registry referring process (S905), when identification information such as the application program identifier is stored in the EMD registry (S907), the EMD application program is started (S909).

On the other hand, in a case where the Content URL is present in the starting file (S903), the starting application program determining module 305 executes a subscription information checking process for checking subscription information (S915).

As described above, when the subscribing process is driven, one or more sets of the subscription information are stored in the subscription tables by the subscribing module 315. The starting application program determining module 305 transfers the referring process for referring the subscription information stored in the subscription table or the like, for instance, to the subscribing module 315, and receives the reference result from the subscribing module 315.

In the subscription information checking process (S915), each CID described in the starting file is read, and checked whether or not the CID corresponds to any of CIDs included in the subscription information stored in the subscription table. In a case where the same CID exists in the subscription information (S917), the recording medium application program is started (S919).

In the subscription information checking process (S915) in this embodiment, in a case where CIDs described in the starting file are read one by one and the CIDs correspond to all of the CIDs in the subscription information, it is determined that the corresponding CIDs exit, but the present invention is not limited to this configuration, and the present invention can also be carried out with the configuration in which at least one corresponding CID exits in the subscription information, it may be determined that the corresponding CID exit (S917). Further, the present invention can be carried out also with the configuration in which, when it is determined that the corresponding CID exits (S917), an application program is started as corresponding to an application program identifier indicated in the latest subscription information among the sets of subscription information with respect to registration time.

In the case where the corresponding CID is not present (S917), the checking process is executed for checking whether or not any other application program to process the contents data is installed (S921), and when such an installed application program exists, then the application program is started (S923). With this operation, the series of process for identifying the application program is finished.

A process in this embodiment after the starting application program identifying process (S805) is described again with reference to the FIG. 8. At first, the application program is identified and started in the starting application program identifying process (S805). Then to determine whether or not the started application program is appropriate to process the contents data, the verifying module 311 executes a verifying process (S807).

The verifying process (S807) is a process of verifying application program identifiers and version identifiers and the like in the EMD registry or in the subscription information to disabled contents information in the disabled contents list information received together with the starting file from the web server 160 via the network 103.

Figure 10:
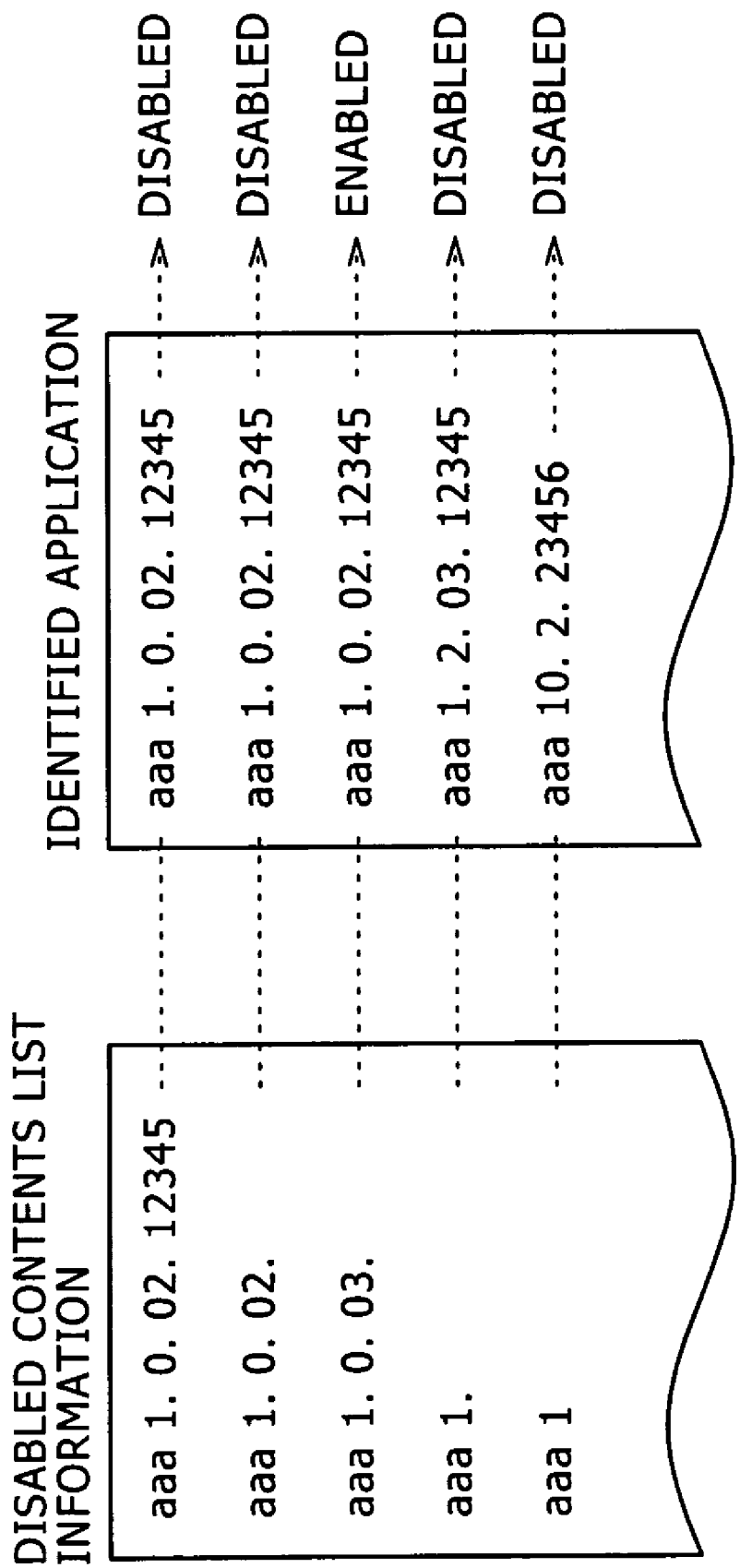
FIG. 10 is an explanatory view showing an outline of a verifying process according to the embodiment.

The verifying process in this embodiment is described bellow with reference to FIG. 10. FIG. 10 is an explanatory view showing the verifying process according to this embodiment.

The verifying module 311 fetches application program identifiers and version identifiers and the like included in the disabled contents list information by fetching the relevant disabled contents list information from the disabled contents list information database, and by assigning a process of referring one or more disabled contents information described in the disabled contents list information to the list fetching module 309.

Also the verifying module 311 fetches the application program identifiers and the version identifiers identified in the starting application program identifying process (S805) from a saving space in the memory section 204, and verifies the identifiers to those in the disabled contents information fetched by the list fetching module 309. In the example above described, both the application program identifiers and version identifiers are verified, however the embodiment does not limited to the example and the case may be allowed where either version identifier or application program identifier is verified.

Further when the identified application program is used for a recording medium, application program identifiers and version identifiers may be fetched by assigning the referring process of the subscription information stored in the subscription table to the subscribing module 315 instead of fetching the identifiers from the saving space in the memory section 204. Similarly, when the identified application program is the EMD application program, application program identifiers and version identifiers described in the EMD registry may be fetched again.

In a case shown in FIG. 10 where the application program identifier and the version identifier of the disabled contents information are "aaa" and "1. 0. 02. 12345" respectively, and the application program identifier and the version identifier of the identified application program are "aaa" and "1. 0. 02. 12345" respectively, the verifying module 311 determines that the case is "disabled" due to "full-match", namely that the identifiers are matched fully each other.

Also in a case where the application program identifier and the version identifier of the disabled contents information are "aaa" and "1. 0. 02." respectively, and the application program identifier and the version identifier of the identified application program are "aaa" and "1. 0. 02. 12345" respectively, the verifying module 311 determines that the case is "disabled" due to "partial-match", namely that the version identifiers are partially matched in the initial part of "1. 0. 02".

On the other hand, in a case where the application program identifier and the version identifier of the disabled contents information are "aaa" and "1. 0. 03" respectively, and the application program identifier and the version identifier of the identified application program are "aaa" and "1. 0. 02. 12345" respectively, the verifying module 311 determines that the case is "enabled" due to "not-match", namely that "1. 0. 03" and "1. 0. 02." does not match.

And also in the case where the application program identifier and the version identifier of the disabled contents information are "aaa" and "1." respectively, and the application program identifier and the version identifier of the identified application program are "aaa" and "1. 0. 02. 12345" respectively, the verifying module 311 determines that the case is "disabled" due to "partial-match", namely that the version identifiers are partially matched in the initial part of "1."

Moreover in a case where the application program identifier and the version identifier of the disabled contents information are "aaa" and "1" respectively, and the application program identifier and the version identifier of the identified application program are "aaa" and "10. 2. 23456" respectively, the verifying module 311 determines that the case is "disabled" due to "partial-match", namely that the version identifiers are partially matched only in the initial part of "1". In other words, when the application program identifier and the version identifier of the disabled contents information are "aaa" and "1" respectively, the verifying module determines that any application program with the version identifier starting from "1" is "disabled".

The verifying process according to this embodiment is describe above with reference to a case where verification is performed with the disabled contents information, but the present invention is not limited to such configuration, and also the configuration is allowable in which the enabled contents information is used for verification instead of the disabled contents information for identifying an application program capable of processing the contents data. In this case, when the corresponding enabled contents information is not present, a measure is taken so that the disabled application program is identified after accessing predetermined URL address with the link destination information thereof stored in advance to upgrade a version of the application program.

Again, as shown in FIG. 8, when it is determined as a result of the verifying process (S807) that contents data is disabled (S809), the link destination information fetching module 313 executes a process for fetching the link destination information (S811).

The link destination information indicates a series of information including a URL identifying code, a URL identifying data size, and a URL character string, each of which is included in the disabled contents information 701 shown in FIG. 7. When the contents data is still determined as disabled, the system can fetch a message described in the message character string included in the disabled contents information 701 and displays a message for prompting a user to upgrade its version in a screen of the displaying section 108.

The link destination information fetching module 313 checks the URL character string (URL information) and the like of the link destination information fetched by the process above described, and then delivers the URL information to the verifying module 311 (S813). When the verifying module 311 receives the URL information, the verifying module 311 transmits the information to the application program (S813).

Therefore, as the application program activates a web browser or the like, the user can access a page with an installer and the like described in the URL information, and can download the installer for installing an application program of an appropriate version according to the web information displayed on the screen.

With the operation described above, a series of the application program determining processes in this embodiment is finished. When the contents data is processed with the process described above, even in a case where a bug exists in the application program, the system can efficiently avoid the contents data process by an irrelevant application program by storing the bug as disabled contents information in the disabled contents list information database, which allows the system to efficiently avoid an implementation of a illegal process by a malicious user.

Since it is allowable to register into the disabled contents list information database the disabled contents information having several types of application program identifiers and version identifiers independent to the application program by contents data unit, illegal operation not only to a single type of application, but also a plurality of applications of different types or versions of application program can efficiently be prevented. Particularly the process by the EMD application program distributing the contents data via the network and the recording medium application program via the recording medium 107 can efficiently be prevented.

By describing several types of application program identifiers and version identifiers in the disabled contents information, it is possible to present a list of application programs which are not permitted to process the contents data for each contents data unit.

Further when it is determined that the application program for processing the contents data is inappropriate, the user terminal guides the user to install the application program with a relevant version or another application program using the screen with the linked page thereon in which the installer is stored, so that the user can efficiently install the application program of the relevant version.

The preferred embodiment of the present invention is described above with reference to the accompanying drawings, but the present invention is not limited to the embodiment. It should be understood that those skilled in the art can assume various modifications and alterations, and line within the technical scope of claims of the present invention and such modifications and alternations are recognized to be within the technical scope of the present invention.

The embodiment is described as above with reference to a system including the contents reproducing module 301, the contents recording module 303, the starting application program determining module 305, the parsing module 307, the list fetching module 309, the verifying module 311, the link destination information fetching module 313, and the subscribing module 315. The present invention, however, is not limited to the configuration. The present invention can be implemented with the configuration in which at least one hardware is replaced with the modules described above, for instance a reproducing section, a recording section, a starting application program determination section, a parsing section, a verifying section, a link destination information fetching section, a reserving section.

What is claimed is:

1. An executability determining method for enabling/disabling an application program, in an information processing apparatus, for processing contents data comprising the steps of:
   determining an application program, for performing contents data reproducing/copying processing of said contents data, by referring to a starting file, said starting file being transmitted from outside the information processing apparatus in correspondence with said contents data;
   fetching a list of disabled contents information indicating at least one type or version of an application program with execution thereof disabled in the contents data reproducing/copying processing; and
   verifying whether a type or a version of said application program corresponds with one of the at least one type or version of an application program indicated in said disabled contents information;
   wherein, when it is determined as a result of the verifying that the type or the version of said application program identified by referring to said starting file corresponds to one of the at least one type or version of an application program described in the list of said disabled contents information, said starting file is not distributed to said application program and contents data is not processed by said application program.

2. The executability determining method according to claim 1, wherein, when it is determined that the type or version of the application program identified by referring to said starting file corresponds to a type or a version of any application program described in the list of said disabled contents information, presence information indicating presence of specific information for installing an application not corresponding to any disabled contents information described in the list of said disabled contents information is fetched from the disabled contents information.

3. The executability determining method according to claim 2, wherein said specific information is install information required for installing an application program of a newer version as compared to a version of the application program corresponding to any of those described in said disabled contents information.

4. The executability determining method according to claim 1, wherein type or version of an application program for each contents data is identified by referring to said starting file, and the identified type or version is verified to said disabled contents information.

5. The executability determining method according to claim 1, wherein the list of said disabled contents information is dynamically generated for each unit of the contents data each time the list of said disabled contents information is demanded.

6. An information processing apparatus storing an application program for processing contents data comprising:
   an application program determining module for determining an application program, for performing a contents data reproducing/copying process of said contents data, by referring to a starting file, said starting file being transmitted from outside the information processing apparatus in correspondence with said contents data;
   a list fetching section for fetching a list of disabled contents information, transmitted from outside the information processing apparatus, indicating at least one type or version of an application program prevented from processing the contents data when said contents data is subjected to the contents data reproducing/copying process; and
   a verifying section for verifying whether a type or a version of said application program corresponds to a type or version of the at least one type or version of an application program indicated in the list of said disabled contents information;
   wherein, when it is determined as a result of verification that the type or the version of said application program identified by referring to said starting file corresponds to one of the at least one type or version in the list of said disabled contents information, said starting file is not distributed to said application program and processing of contents data by said application program is prevented.

7. The information processing apparatus according to claim 6 further comprising:
   a presence information fetching section for fetching, from the disabled contents information, presence information indicating presence of specified information for installing an application program not corresponding to any application program included in the list of said disabled contents information.

8. The information processing apparatus according to claim 7, wherein said specified information is necessary for installing an application program of a newer version as compared to a version of the application program not corresponding to any application program included in said disabled contents information.

9. The information processing apparatus according to claim 6, wherein type or version of an application program for each contents data is identified by referring to said starting file, and said verifying section verifies said identified type or version by referring to said disabled contents information.

10. The information processing apparatus according to claim 6, wherein the list of said disabled contents information is dynamically generated for each unit of the contents data in response to a request from said list fetching section.

11. A computer-readable storage medium storing instructions therein, which, when executed by a processor cause the processor to execute an executability determining method for enabling/disabling execution of an application program, in an information processing apparatus, for processing contents data, the method comprising:
   determining an application program, for performing contents data reproducing/copying processing of said contents data, by referring to a starting file, said starting file being transmitted from outside the information processing apparatus in correspondence with said contents data;
   fetching a list of disabled contents information indicating at least one type or version of an application program with execution thereof disabled in the contents data reproducing/copying processing; and
   verifying whether a type or a version of said application program corresponds with one of the at least one type or version of an application program indicated in the list of said disabled contents information
   wherein, when it is determined as a result of the verifying that the type or the version of said application program identified by referring to said starting file corresponds to one of the at least one type or version of an application program described in the list of said disabled contents information, said starting file is not distributed to said application program and contents data is not processed by said application program.

* * * * *